Figure 1:
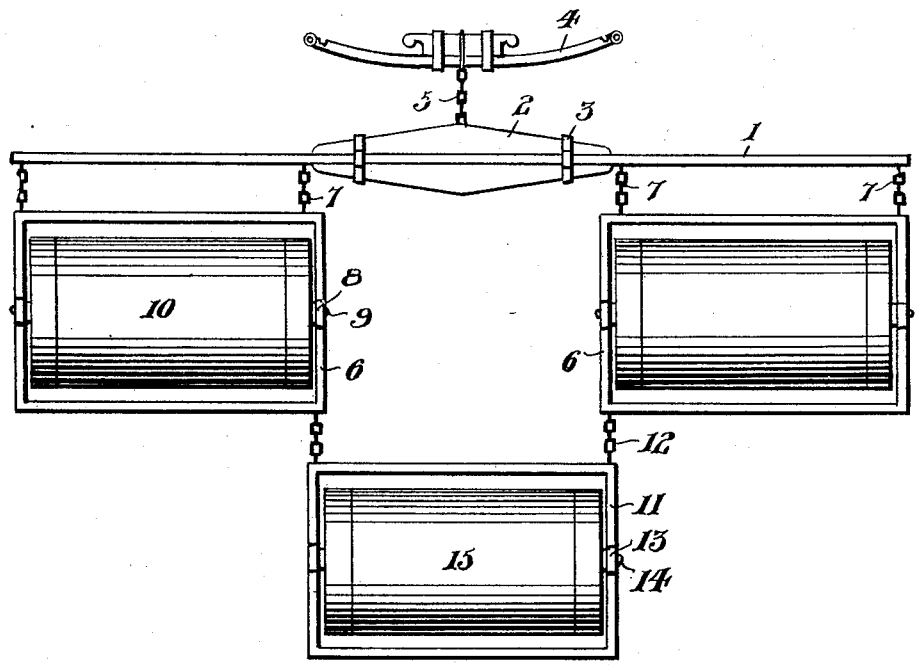

F. JOZSIBÁN.
SOIL PULVERIZER.
APPLICATION FILED FEB. 24, 1913.

1,111,539.

Patented Sept. 22, 1914.

WITNESSES

INVENTOR
F. Jozsibán
By Henry C. Evert
ATTORNEY

UNITED STATES PATENT OFFICE.

FLORIAN JOZSIBÁN, OF MAURER, NEW JERSEY.

SOIL-PULVERIZER.

1,111,539.  Specification of Letters Patent.  Patented Sept. 22, 1914.

Application filed February 24, 1913. Serial No. 750,434.

*To all whom it may concern:*

Be it known that I, FLORIAN JOZSIBÁN, a subject of the King of Hungary, residing at Maurer, in the county of Middlesex and State of New Jersey, have invented certain new and useful Improvements in Soil-Pulverizers, of which the following is a specification, reference being had therein to the accompanying drawing.

This invention relates to a soil pulverizer, and the object of my invention is to provide an agricultural implement embodying rollers that are arranged to be drawn over plowed soil to disintegrate and crush clods and large lumps of earth preparatory to planting.

I attain the above object by a simple, durable and inexpensive agricultural implement that can be drawn by one or more horses, a tractor or other power, the implement consisting of units that can be arranged whereby a desired area of ground can be covered by the implement when in operation.

The invention will be hereinafter specifically described and then claimed, and reference will now be had to the drawing, wherein:—

Figure 2:
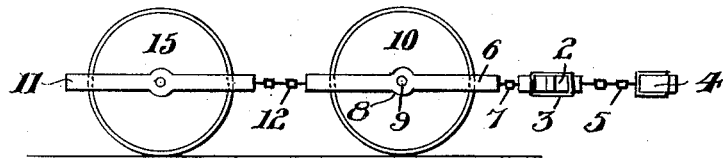

Figure 1 is a plan of the pulverizer, and Fig. 2 is a side elevation of the same.

Further describing my invention in detail with reference to the accompanying drawing, wherein like numerals denote corresponding parts throughout: 1 denotes a transverse beam secured upon a cross head 2 by clamps 3 or other fastening means.

4 denotes a swingle or double-tree of the ordinary and well known type that is connected by a chain 5 or other connection to the cross head 2.

6 denotes rectangular frames arranged at the ends of the beam 1 and connected thereto by chains 7 or other connections. The frames 6 are provided with longitudinally alining bearings 8 and journaled in said bearings are the spindles 9 of crushing rollers 10.

11 denotes a trailer frame connected to the inner ends of the frames 6 by chains 12 or other connections. The trailer frame 11 has bearings 13 for the spindles 14 of a roller 15. The roller 15 is similar in construction to the rollers 10 and is adapted to disintegrate and crush the clods and large pieces of soil that are not touched by the rollers 10.

The chains 7 and 12 are such that they can be easily detached relatively to the beam 1 and the frames 6 and it is possible to dispense with the trailer roller 15 and move the rollers 10 closer together, whereby a smaller area of ground can be covered by the two rollers than the three.

The pulverizer in its entirety is made of strong and durable metal and the rollers 10 and 15 can be interiorly weighted whereby they will have a great crushing effect when passing over clods and lumps of earth.

What I claim is:—

A soil pulverizer comprising a beam, a pair of rectangular frames arranged rearwardly and adjacent the opposite ends thereof, a pair of flexible connections between each of the said frames and said beam, a rectangular frame arranged centrally of said beam and rearwardly of said frames, flexible connections between first named frames and the said rear frame, crushing rollers rotatably mounted in the said rectangular frames and adapted for crushing the soil when moved there-over.

In testimony whereof I affix my signature in the presence of two witnesses.

FLORIAN JOZSIBÁN.

Witnesses:
 STIP KOTZUN,
 JOHN WHALEN, Jr.

---

Copies of this patent may be obtained for five cents each, by addressing the "Commissioner of Patents, Washington, D. C."